July 12, 1955 W. W. PHARIS 2,713,089

TRUNK CIRCUIT FOR TELEPHONE SYSTEMS

Filed Oct. 8, 1952 5 Sheets-Sheet 1

INVENTOR.
WILLIAM W. PHARIS
BY Francis E. Blake
ATTORNEY

July 12, 1955 W. W. PHARIS 2,713,089

TRUNK CIRCUIT FOR TELEPHONE SYSTEMS

Filed Oct. 8, 1952 5 Sheets-Sheet 2

INVENTOR.
WILLIAM W. PHARIS
BY Francis E. Blake
ATTORNEY

TRUNK CIRCUIT FOR TELEPHONE SYSTEMS

Filed Oct. 8, 1952 5 Sheets-Sheet 3

INVENTOR.
WILLIAM W. PHARIS
BY
Francis E. Blake
ATTORNEY

INVENTOR.
WILLIAM W. PHARIS
BY Francis E. Blake
ATTORNEY

INVENTOR.
WILLIAM W. PHARIS
BY Francis E. Blake
ATTORNEY

United States Patent Office 2,713,089

Patented July 12, 1955

2,713,089

TRUNK CIRCUIT FOR TELEPHONE SYSTEMS

William W. Pharis, Rochester, N. Y., assignor to Stromberg-Carlson Company, a corporation of New York Application October 8, 1952, Serial No. 313,666

12 Claims. (Cl. 179—27)

This invention relates to telephone systems and more particularly to trunk circuits for use in extending a call from a branch automatic telephone office to a main office of either manual or automatic mode of operation.

In previous circuits of this type, an attendant at the branch office operator's position was required to directly select a particular one of two outgoing trunk groups without the use of dialed pulses.

It is an object of my invention to provide a trunk circuit to be controlled from an attendant's cabinet so that an attendant may directively control by dial impulses the selection of a particular one of a plurality of outgoing trunk groups.

It is a feature of my invention to provide a trunk circuit using a simple form of single motion rotary switch arranged to be controlled by dial impulses from an attendant's cabinet in a manner to select one of two or more groups of trunks and automatically hunt for an idle trunk in the selected trunk group.

Yet another object of the invention is to provide an information trunk circuit for use with a P. B. X attendant's cabinet and having improved means to enable a central office operator to signal the attendant when desired.

Figure 1:
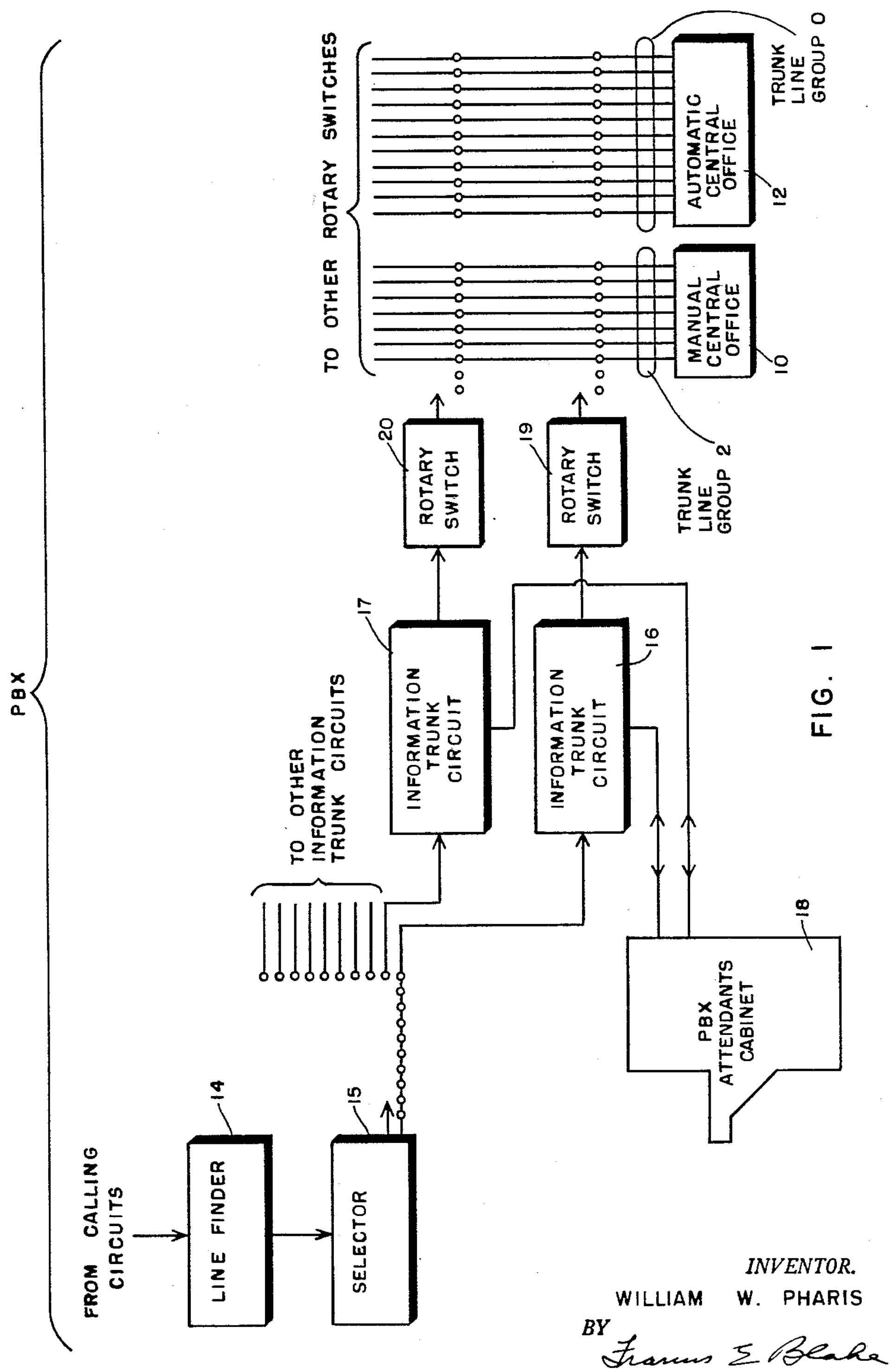
Figure 2:
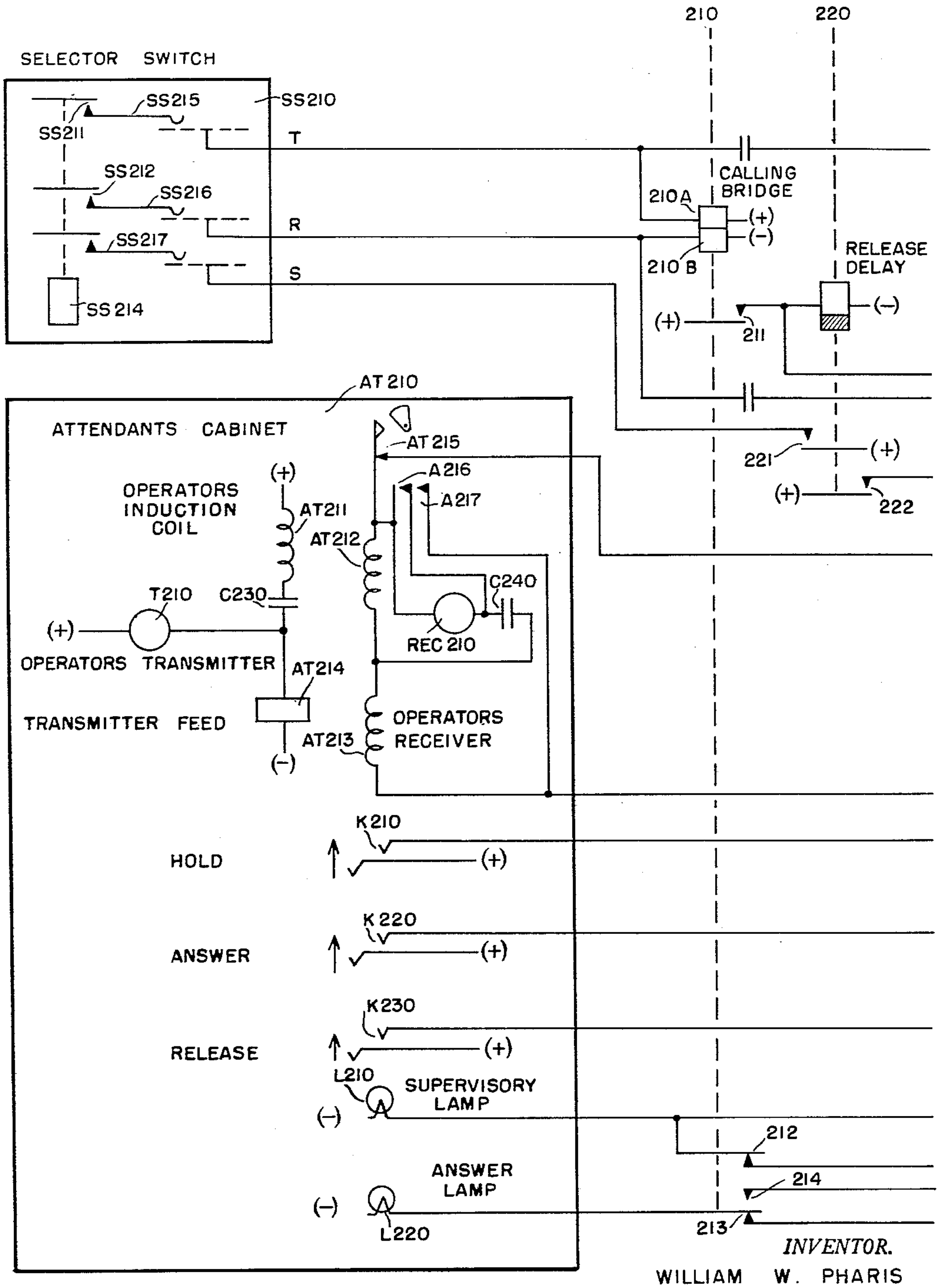
Figure 3:
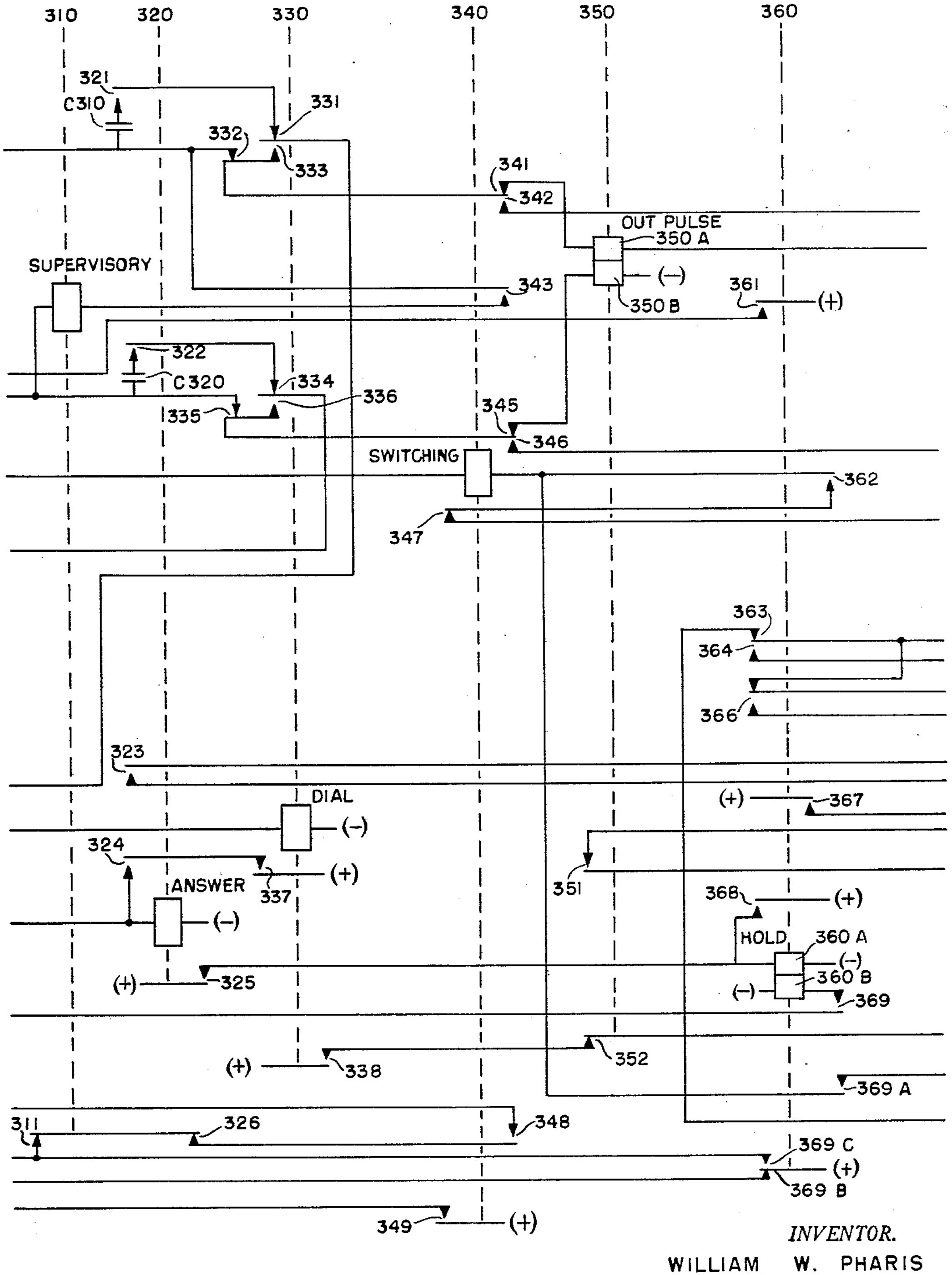
Figure 4:
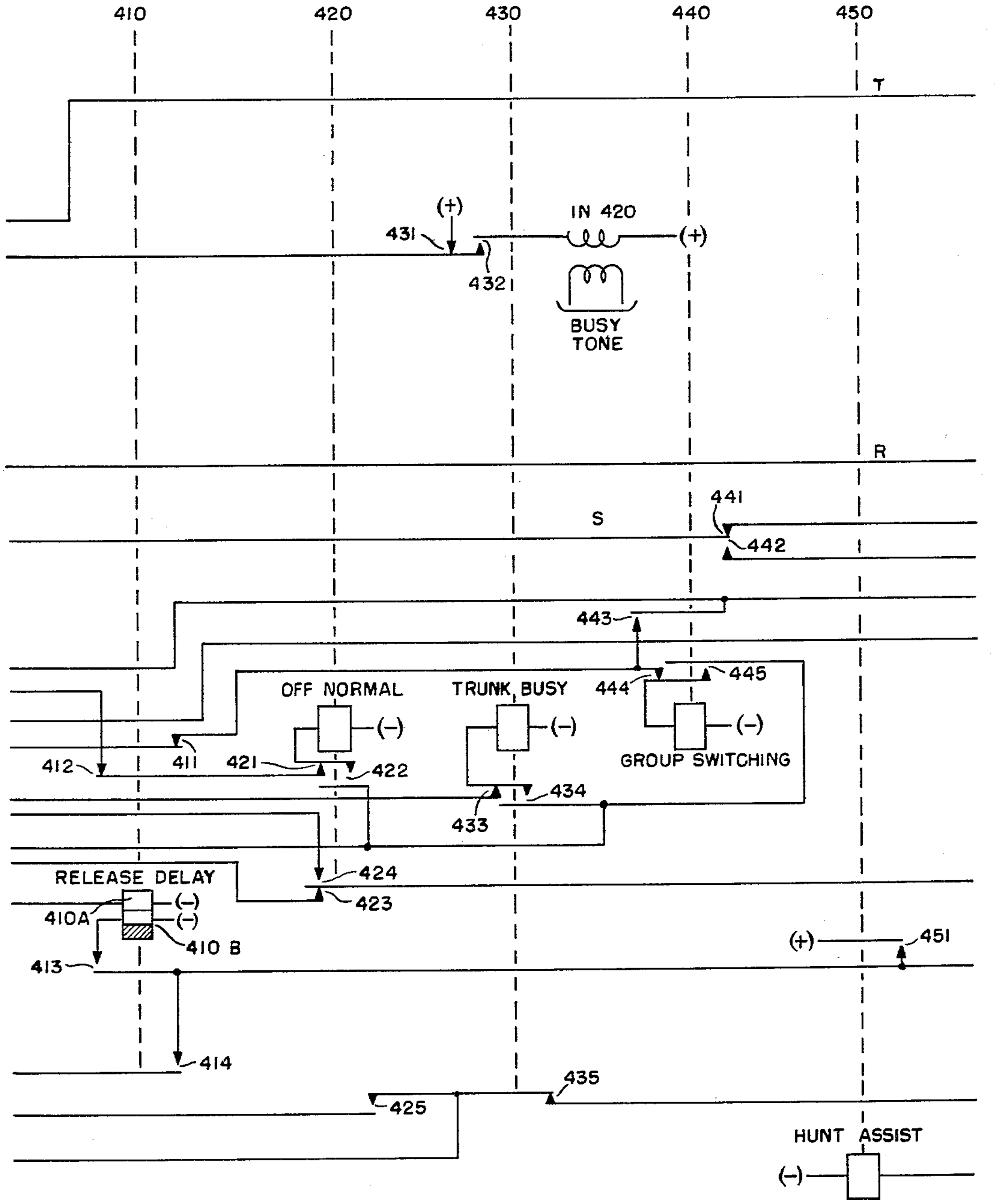
Figure 5:
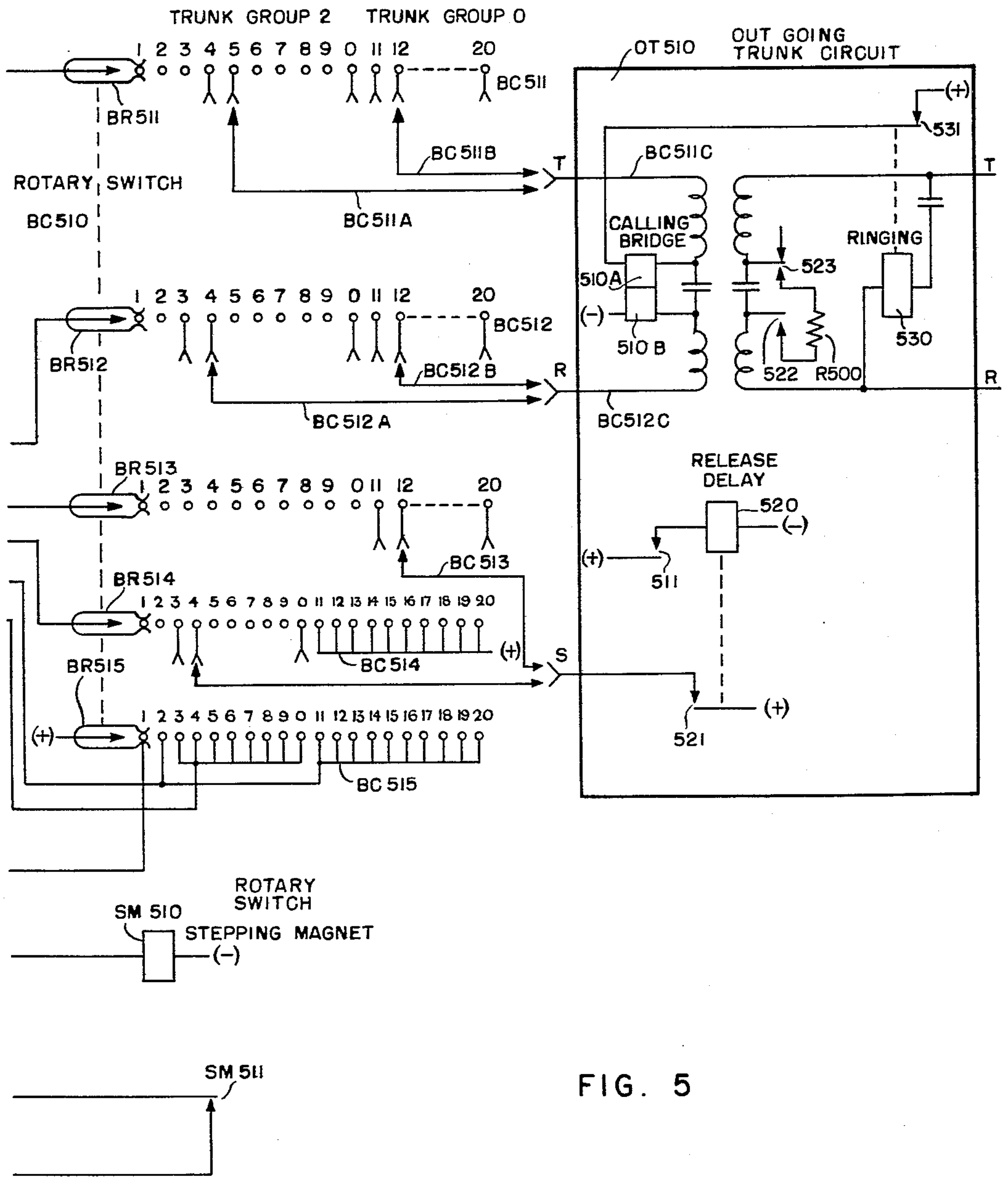

My invention itself as to its organization and method of operation, together with further objects and advantages thereof may best be understood by reference to the following description, taken in connection with the accompanying drawings in which;

Fig. 1 is a block diagram to show a private branch exchange telephone system embodying the trunk circuits of the invention;

Fig. 2 is a schematic diagram of the essential circuit features of the P. B. X selector and attendant's cabinet associated with the trunk circuit of the invention;

Figs. 3 and 4 when placed to the right of Fig. 2 in consecutive order show the schematic diagram of the trunk circuit; and Fig. 5 when placed to the right of Fig. 4 is the schematic diagram of the rotary switch operated by the trunk circuit and also shows the essential portions of an outgoing trunk circuit which may be selected and seized by the rotary switch.

Referring to the drawings, it should be understood that the selector switch and the outgoing trunk are for the most part conventional, and any similar components known in the art may be utilized for the designated functions and purposes.

The telephone system of Fig. 1 has been simplified to more clearly show the interrelating functions of the information trunk circuit of the invention. For example, it will be assumed that a calling party in a small private branch exchange desires to be connected with an outside party through either a manual central office or an automatic central office. The manual central office 10 is connected to a plurality of trunk lines such as the eight lines in trunk group 2 while the automatic central office 12 is connected to a plurality of trunk lines such as the ten lines in trunk group 0. The calling party upon closing his hook switch and thereafter dialing "0" causes the line-finder 14 and the selector 15 linked therewith to be operated to seize an idle information trunk circuit such as either one of the trunk circuits shown at 16 and 17. Seizure of the idle information trunk circuit is signaled to the attendant's cabinet 18 in the P. B. X and the attendant operates an appropriate answer key to establish a conversation connection with the calling party. The calling party may then inform the attendant of the desired outside number to be reached through either the manual central office 10 or the automatic central office 12. The number of the desired party, of course, indicates to the attendant which group of trunk lines, i. e., group 2 or group 0 must be used. The attendant then operates an appropriate hold key for the corresponding seized information trunk circuit such as shown at 16 or 17 to thereby split the calling line and at the same time enable the attendant to dial a single digit to operate the particular one of the rotary switches such as shown at 19 and 20 that is connected with the selected information trunk to thereby select an idle trunk line in either trunk group 2 or 0 depending upon the digit dialed. For example, assume that the calling party has been connected by selector 15 and the information trunk circuit 16 to the attendant's cabinet 18 and desires a connection with a line at the manual central office 10. After operating the hold key, the attendant dials the digit "2" which operates the rotary switch 19 to select an idle trunk line in the trunk group 2 connecting with the manual central office 10. The attendant may then inform the operator at the central office 10 of the desired number and upon the called party answering, the P. B. X attendant can connect the calling party through to the called party by restoring the hold key. According to the invention, the rotary switches 19 and 20 are so connected with their associated information trunk circuits 16 and 17 that they are operated to hunt for an idle trunk line in the desired trunk group depending upon the prefix digit dialed by the attendant. Should the calling party desire a connection with a line from the automatic central office 12, the attendant at the attendant's cabinet 18 would dial the prefix digit "0" which would operate the rotary switch 19 to select an idle trunk line in the trunk group 0 connected to the automatic central office 12. After obtaining a trunk line in trunk group 0, the attendant may dial the desired directory number to operate the dial equipment at the central office 12 and when the called party answers, the attendant connects the calling party through by restoring the hold key.

It should be pointed out that each of the rotary switches such as the switch 19 are preferably twenty position single motion rotary switches which, in accordance with the invention, are operated to return to contact position one on the release of the trunk circuit when the attendant operates the release key. In the event that all trunk lines in the desired trunk group are busy, the rotary switch is automatically stepped to contact position one and appropriate relays of the information trunk are then operated to transmit an audible busy signal to the attendant. The attendant then restores the answer and hold keys and the busy tone is thereby transmitted to the calling party. The information trunk circuit of the invention also provides that the attendant may redial in the event an error is made and for such purpose the release key at the attendant's cabinet is operated while the hold and answer keys are likewise operated to thus enable the attendant to hold the connection with the line of the calling party while the rotary switch is returning to position one for redialing. This will be described more in detail in the following description with reference to Figs. 2–5 of the drawings.

The progress of a call from a selector switch SS210 in Fig. 2, through the trunk circuits in Figs. 2 to 5 and through an outgoing trunk OT510 to a manual or an automatic telephone office will now be described. The selector switch SS210 is assumed to have been directively pulsed to the required level and an idle trunk circuit selected causing switching relay SS214 to operate in the well known manner. The loop circuit, across the calling party's conductors T and R, energizes calling bridge relay 210 from ground (+) through winding 210A, bank contact T, T brush SS215, operated contacts SS211, said calling party loop, operated contacts SS212, R brush SS216, bank contact R and through winding 210B to battery (−). The operation of the calling bridge relay 210 energizes release delay relay 220 from ground through operated contacts 211, and through winding of relay 220 to battery. Operation of the calling bridge relay 210 also lights the answer lamp L220 from ground through normally closed contacts 369B, (Fig. 3), operated contacts 214, and through lamp L220 to battery, to visibly indicate an incoming call to the attendant. The operation of the release delay relay 220 also connects ground through operated contacts 221 to bank contact S and S brush SS217, to hold the preceding equipment in an operated condition and to guard this information trunk circuit against seizure by another selector.

The operator at attendant's cabinet AT210 now answers the indicated call by operating answer key K220 to energize answer relay 320 (Fig. 3) from ground through the winding of relay 320 to battery. Operation of relay 320 energizes hold relay 360 from ground through operated contacts 325, and through winding 360A to battery. Operation of relay 320 also connects a transmission circuit from the calling conductors T and R through capacitors C310 and C320, operated contacts 321 and 322, normally closed contacts 331 and 334, and normally closed dial pulsing contacts AT215, to the attendant's induction windings AT212 and AT213. The attendant now converses with the calling party by means of the transmitter circuit from ground, through transmitter T210 and through winding AT214 to battery and also through capacitor C230 through induction winding AT211 to ground, and by means of the receiver circuit REC210 and capacitor C240 across induction winding AT212, both transmitter and receiver means being of a type well known in the art.

The hold relay 360, upon operating, connects a holding circuit for itself from ground through operated contacts 368. Operation of relay 360 also extinguishes the answer lamp L220, by opening ground at contacts 369B. The operation of relay 360 also closes a holding circuit for release delay relay 220 at contacts 361 so that the final release of the call is under the control of the operator at attendant's cabinet AT210 who operates the release key K230 to close ground through operated contacts 369, and through winding 360B to battery. The windings 360A and 360B are in differential opposition to each other so that, when both windings are connected to ground, relay 360 restores and does not again reoperate due to the formerly operated contacts 368 and 369 now being open. It should be mentioned that the answer key K220 and release key K230 are preferably a single switch unit having a single operating lever so that when the answer key is closed the release key is open and vice versa. In Fig. 2 the keys 220 and 230 have been shown as separate switches which may be an alternate arrangement provided that both keys are not operated at the same time.

As shown in Fig. 5, the outgoing trunks such as OT510 are connected by jumpers to the contact banks of the five bank single motion rotary switch generally indicated at BC510 and are divided into two groups, one group accessed by dialing the digit "2" and the other group by dialing "0." Assuming that the calling party has requested connection to a party which requires the use of trunk group 2 and the consequent dialing of the prefix digit "2," the attendant will operate the hold key K210 to energize dial relay 330 from ground through the winding of relay 330 to battery. Operation of dial relay 330 completes a holding circuit for answer relay 320 from ground through operated contacts 337 and 324. Operation of dial relay 330 also transfers the previously described attendant's transmission loop circuit from the calling party's conductors T and R, at contacts 331 and 334, also at contacts 332 and 335, to the out pulse relay 350 which energizes from ground through normally closed contacts 431, (Fig. 4), winding 350A, normally closed contacts 341, operated contacts 333, induction windings AT213 and AT212, dial pulsing springs AT215, operated contacts 336, normally closed contacts 345, and through winding 350B to battery.

It should be understood that rotary switch BC510 is normally resting in contact position one as will be later described in detail. The operation of out pulse relay 350 energizes release delay relay 410 (Fig. 4) from ground through rotary switch brush BR515, contact 1 of bank contacts BC515, normally closed contacts 423, operated contacts 351, and through winding 410A to battery. The operation of the release delay relay 410 prepares an operating circuit for the rotary switch stepping magnet SM510 through contacts 413 and 414. The attendant at the attendant's cabinet now dials the digit "2," in the well known manner, to select an outgoing trunk in trunk group 2. As the dial is rotated from its normal position, contacts AT216 operate to shunt the operator's receiver REC210 to eliminate audible clicks due to the subsequent pulsing procedure, and contacts AT217 also operate to shunt the induction windings AT212 and AT213 to improve the pulsing characteristics to the out pulse relay 350.

As the dial restores to its normal position, pulse springs AT215 open once for each of the two assumed digit 2 pulses. As the pulse springs open each time, out pulse relay 350 restores correspondingly to operate the rotary switch stepping magnet SM510 in like manner, from ground through operated contacts 338, pulsing contacts 352, operated contacts 414, and through winding of stepping magnet SM510 to battery. The release delay relay 410 remains operated from pulsing ground through operated contacts 413 and winding 410B, due to its slow release characteristic. At the completion of the second digit pulse and the return of the dial to normal, dial springs AT215 reclose to reoperate out pulse relay 350 and at operated contacts 352 open the holding circuit for winding 410B of release delay relay 410. Since the rotary switch is now stepped off-normal to contact position 3, the circuit from ground on rotary switch brush BR515 through normal contacts 423 and operated contacts 351 to winding 410A of the release delay relay 410 is also opened and relay 410 restores to normal.

With the brush BR515 stepped to contact 3 of bank contacts BC515 simultaneously with the restoration of the dial to normal position, and the consequent restoration of the release delay relay 410, the group switching relay 440 will operate from ground through brush BR515, contact 3 of bank contacts BC515, operated contacts 366, normally closed contacts 411 and 444, and through winding of relay 440 to battery. Operation of group switching relay 440 closes a holding circuit for itself through contacts 445 and 367. The operation of relay 440, through operated contacts 443 connects ground from normal contacts 411, operated contacts 366 and contact 3 of BC515 and brush BR515 to the winding of off-normal relay 420 through operated contacts 366, normal contacts 412 and normal contacts 421 to thereby operate relay 420. The operation of relay 420 connects a holding circuit for itself through operated contacts 367 and 422. The operation of relay 440 also transfers the S lead from the rotary switch S bank contact BC515 to BC514, by opening contacts 441 to brush BR513 and closing contacts 442 to brush BR514.

Bank contact 3 of BC514 is the guarding lead of the first outgoing trunk in the dialed group 2 and, if it is not in use at the completion of the dialing of the assumed digit 2 as indicated by an absence of ground, the switching relay 340 will operate from ground through operated contacts 222, winding of switching relay 340, operated contacts 369A and 425, normally closed contacts 435, magnet coil interrupter contacts SM511, and through winding of hunt assist relay 450 to battery. Hunt assist relay 450 is designed so that it will not operate through the high resistance of the coil of the switching relay 340. The operation of switching relay 340 opens the holding circuit for out pulse relay 350 at contacts 341 and 345, restoring it to its normal condition. Switching relay 340, upon operating, also closes calling party's conductors T and R through operated contacts 342 and 346, and energizes the calling bridge relay 510 in outgoing trunk from ground through normally closed contacts 531, winding 510A, T conductor, jumper leads BC511C and BC511A, contact 3 of bank contacts BC511, T brush BR511, operated contacts 342 and 333, through the attendant's cabinet AT210 transmission and dialing circuit previously described, operated contacts 336 and 346, R brush BR512, R jumper leads BC512A and BC512C, and through winding 510B to battery. The operation of calling bridge relay 510 in the outgoing trunk energizes the release delay relay 520 from ground through operated contacts 511, to connect ground through operated contacts 521 to the incoming S conductor and contact 3 of bank contacts BC514, to guard this outgoing trunk circuit from simultaneous seizure by another similar call. The operation of the slow release relay 520 also operates contacts 522 and 523 to connect the impedance coil R500 in series with the outgoing trunk line to provide signaling at the other end of the trunk line.

In the event the first trunk line in trunk group 2 is busy, ground will be found connected to contact 3 of the rotary switch bank contacts BC514 at the completion of the dialing of the assumed digit 2 and the hunt assist relay 450 will then be energized from said ground on bank contact 3 through brush BR514, operated contacts 442, normally closed contacts 347, operated contacts 362, 369A and 425, and normally closed contacts 435 and interrupter contacts SM511 through winding of relay 450 to battery. The switching relay 340 does not operate at this time as it is now connected to ground on each side of its winding. The operation of the hunt assist relay 450 energizes stepping magnet SM510 from ground through operated contacts 451, through stepping magnet SM510 to battery. The stepping magnet moves brushes BR511—BR515 to the next bank contact and also opens interrupter contacts SM511 to restore hunt assist relay 450 to its normal condition which opens said operating ground from the stepping magnet at contacts 451. This interaction between hunt assist relay and stepping magnet continues until an S bank contact for group two trunk lines is encountered with no ground connected to it. Then the stepping of the rotary switch brushes stops and the switching relay 340 operates, as previously described.

If there is no idle outgoing trunk in group 2, brush BR514 will be still connected to ground on rotary switch contacts 11—20 of bank contacts BC514 so that the stepping magnet SM510 will continue to move the brushes until contact 1 of bank contacts BC515 is again encountered on the next cycle of the brushes over the bank contacts. At that time, the trunk busy relay 430 will be energized from ground through brush BR515, contact 1 of bank contacts BC515, operated contacts 424 and 323, normally closed contacts 433, and through winding of relay 430 to battery. Relay 430, upon operating, closes a holding circuit for itself from ground through operated contacts 367 and 434. Operation of trunk busy relay 430 also opens ground at contacts 431 from the winding 350A of the outpulse relay 350 and connects that winding through contacts 432 to a busy tone source through the induction coil winding IN420 to audibly indicate to the attendant that all trunks in the desired group are in use. The attendant may then restore the dial and answer keys to audibly connect the said busy tone to the calling party without further notification.

Assume now that the calling party has requested a party which requires the attendant to use trunk group 0 and therefore dial the digit "0" instead of the digit "2," as previously described. The attendant will, in that case, operate the hold key K210 which energizes dial relay 330 as before, and also relays 350 and 410 preparatory for dialing the digit "0." The attendant now dials the digit "0" with the dial and shunting springs AT215—AT217 functioning as previously described. The out pulse relay 350 responds to each of the pulses of the digit 0 to step the rotary switch brushes BR511—BR515 across the bank contacts to bank contacts 11, accordingly. As brush BR515 steps across contacts 2 to 10 of bank contacts BC515, off-normal relay 420 cannot be operated as its operating circuit is open at operated contacts 412. When the pulsing of the digit 0 is completed and relay 410 restores, brush BR515 will be connected to bank contact 11 and off-normal relay 420 will now operate from ground on BR515 through operated contacts 364 and normal contacts 412 and 421. The group switching relay 440 will not operate as it did when dialing the digit "2" since its operating circuit on bank contacts 3 to 10 is open during the pulsing procedure at release delay relay contacts 411. The selection of an outgoing trunk in group 0 and subsequent stepping of the rotary switch on the application of busy tone if all trunks in said group are in use is the same on contacts 11—20 in bank contacts BC513 as for group 2 on bank contacts BC514, and need not be repeated.

The last outgoing trunk in the bank contact groups is shown at contact 20. It will be obvious that the number of trunks in group 0 may be more or less than is shown, depending on the trunking load requirements and on the type of one-motion switching means employed. Incoming wiring for T, R and S conductors for the outgoing trunks OT510 in group 0 are indicated by typical leads BC511B, BC512B and BC513, respectively. Outgoing trunk OT510 has been shown in block form with only the details of essential parts shown, and may be connected by the jumpers as shown to any set of bank contacts in either group 2 or group 0, as required.

If all outgoing trunks in either group 2 or group 0 are in use when dialed by the attendant, or if the attendant desires to redial, the attendant may restore all equipment including the rotary switch BC510 used in the call by operating the release key K230 which restores hold relay 360 in the manner previously described. Hold relay 360 upon restoring opens contacts 367 to open the holding circuit for the off-normal relay 420 and the trunk group relay 440, if such relay was operated. Contacts 369*a* and 362 are returned to normal position to thereby restore the switching relay 340 which thereafter causes the out pulse relay 350 to be again connected across T and R leads and operated. The release of the hold relay 360 also restores contacts 363 to alternately energize the hunt assist relay 450 and the rotary switch stepping magnet SM510 from the ground on the switch brush BR515 and switch contacts 2 and 11 through 20 through the obvious circuit including the operated contacts of the trunk group relay 440 that is operated so long as the switch is in any of the positions of trunk group 2. When the switch reaches contact position one, the hunt assist relay 450 is no longer connected to ground on brush BR515 through normal contacts 363 and the trunk group relay 440 has also been released after the switch brush BR515 engaged switch contacts 11 to 20. Thereafter the operator may restore the release key with the answer key still operated and since the release delay relay 410 has been operated from ground on switch brush BR515 over switch contact one, normal contacts 423 and operated contacts 351, the dial pulsing path for the stepping magnet SM510 is again prepared through operated contacts 414. In such manner the attendant may redial, if desired. On the other hand, if the calling party had released the call, the calling bridge relay 210 and the release delay relay 220 would restore and all other relays would restore, it being assumed that the attendant has received the supervisory signals as will be later described in more detail, and has restored the hold and answer keys at the same time or before the operation of the release key.

Assuming that an idle trunk line has been seized in a trunk group connecting with outgoing trunk OT510 to either a manual or automatic central office, the attendant at attendant's cabinet AT210 may further extend the call through the repeater of outgoing trunk by means of additional directive digits into an automatic telephone office or into a manual office without additional digits. When the necessary procedure to connect with the called party has been completed, the hold key is restored by the attendant to open the holding ground for dial relay 330. Restoration of dial relay 330 opens the dialing loop circuit to the outgoing trunk at contacts 333 and 336, and connects a loop circuit from the calling party through normally closed contacts 332, operated contacts 343, supervisory relay winding 310, normally closed contacts 335, to the previously described holding circuit for the calling bridge relay 510 in outgoing trunk OT510. Supervisory relay 310 becomes operated at this time to open contacts 311 and assure that the supervisory lamp L210 is extinguished so long as the calling bridge relay 210 is operated.

The attendant is now connected to the trunk conductors through capacitors C310 and C320 so long as the answer key is operated to hold answer relay 320. When the attendant restores the answer key, answer relay 320 also restores to open the attendant's circuit at contacts 321 and 322.

When the calling party restores the receiver or handset at the completion of the conversation, the supervisory lamp L210 lights from ground through operated contacts 369C and the restored normally closed contacts 212. The answer lamp also lights from ground through operated contacts 349 and normally closed contacts 213, if the switching relay 340 has operated on an outgoing trunk seizure. The attendant may now restore the hold relay 360 by operating the release key K230, as previously described, to step the rotary switch to normal contact position one and restore all equipment to its normal condition ready for a succeeding call.

If for some reason during the progress of the call the operator at the central office desires to signal the attendant, the central office ring key is momentarily operated to send ringing current over the trunk line and momentarily operate the alternating current ringing relay 530 to momentarily open contacts 531 in series with the loop circuit of the outgoing trunk calling bridge relay 510 and the supervisory relay 310. Thus, contacts 311 are momentarily closed to flash the supervisory lamp L210 by the obvious circuit including normal contacts 326 and operated contacts 348.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a telephone system including, a calling line, an attendant's position, and at least two groups of trunk lines, said attendant's position having answer, release, and hold keys together with impulsing mechanism, an information trunk circuit for connecting said calling line to the attendant's position and for extending a connection of said calling line over a trunk line in a selected trunk line group, said trunk circuit including in combination, means controlled by the operation of said answer key to provide a converation connection between said calling line and said position, means controlled by the operation of said hold key to split the calling line and connect said impulsing means to the trunk circuit, impulse responsive switching means connected in said trunk circuit having a normal position and movable in response to a predetermined number of impulses from said impulsing means to an operated position for selecting a trunk line in one of said groups of trunk lines and in response to a predetermined different number of impulses to a different operated position for selecting a trunk line in another of said groups of trunk lines, means controlled by restoration of said hold key after selection of a trunk line to connect said calling line with the selected trunk line, and means in said trunk circuit responsive to the operation of said release key to restore said switching means to normal position.

2. In a telephone system including, a calling line, an attendant's position, and at least two groups of trunk lines, said attendant's position having answer, release, and hold keys together with impulsing mechanism, an information trunk circuit for connecting said calling line to the attendant's position and for extending a connection of said calling line over a trunk line in a selected trunk line group, said trunk circuit including in combination, means controlled by the operation of said answer key to provide a conversation connection between said calling line and said position, means controlled by the operation of said hold key to split the calling line and connect said impulsing means to the trunk circuit, a single motion impulse responsive rotary stepping switch connected in said trunk circuit having a normal position and adapted to be stepped in response to a predetermined number of impulses from said impulsing means to an operated position for selecting a trunk line in one of said groups of trunk lines and in response to a predetermined different number of impulses to a different operated position for selecting a trunk line in another of said groups of trunk lines, means controlled by restoration of said hold key after selection of a trunk line to connect said calling line with the selected trunk line, and means in said trunk circuit responsive to the operation of said release key to step said switch to return to its normal position.

3. In a telephone system including, a calling line, an attendant's position, and a group of trunk lines, said attendant's position having answer, release, and hold keys together with impulsing mechanism, an information trunk circuit for connecting said calling line to the attendant's position and for extending a connection of said calling line over a trunk line in said trunk line group, said trunk circuit including in combination, means controlled by the operation of said answer key to provide a conversation connection between said calling line and said position, means controlled by the operation of said hold key to split the calling line and connect said impulsing means to the trunk circuit, a single motion impulse responsive rotary stepping switch connected in said trunk circut having a normal position and adapted to be stepped in response to a predetermined number of impulses from said impulsing means to an operated position for selecting a trunk line in said group of trunk lines, means controlled by restoration of said hold key after selection of a trunk line to connect said calling line with the selected trunk line, and means in said trunk circuit responsive to the operation of said release key to step said switch to return to its normal position.

4. In a telephone system including, a calling line, an attendant's position, and at least two groups of trunk lines, said attendant's position having answer, release, and hold keys together with impulsing mechanism, an information trunk circuit for connecting said calling line to the attendant's position and for extending a connection of said calling line over a trunk line in a selected trunk line group, said trunk circuit including in combination, means controlled by the operation of said answer key to provide a conversation connection between said calling line and said position, means controlled by the operation of said hold key to split the calling line and connect said impulsing means to the trunk circuit, impulse responsive switching means connected in said trunk circuit having a normal position and movable in response to a predetermined number of impulses from said impulsing means to an operated position for selecting a trunk line in one of said groups of trunk lines, means controlled by restoration of said hold key after selection of a trunk line to connect said calling line with the selected trunk line, and means in said trunk circuit responsive to the operation of said release key to restore said switching means to normal position.

5. In a telephone system including, a calling line, an attendant's position, and at least two groups of trunk lines, said attendant's position having answer, release, and hold keys together with impulsing mechanism, an information trunk circuit for connecting said calling line to the attendant's position and for extending a connection of said calling line over a trunk line in a selected trunk line group, said trunk circuit including in combination, means controlled by the operation of said answer key to provide a conversation connection between said calling line and said position, means controlled by the operation of said hold key to split the calling line and connect said impulsing means to the trunk circuit, a single motion impulse responsive rotary stepping switch connected in said trunk circuit having a normal position and adapted to be stepped in response to a predetermined number of impulses from said impulsing means to an operated position for selecting a trunk line in one of said groups of trunk lines, means controlled by restoration of said hold key after selection of a trunk line to connect said calling line with the selected trunk line, and means in said trunk circuit responsive to the operation of said release key to step said switch to return to its normal position.

6. In a telephone system including, a calling line, an attendant's position, and a group of trunk lines, said attendant's position having answer, release, and hold keys together with impulsing mechanism, an information trunk circuit for connecting said calling line to the attendant's position and for extending a connection of said calling line over a trunk line in said trunk line group, said trunk circuit including in combination, means controlled by the operation of said answer key to provide a conversation connection between said calling line and said position, means controlled by the operation of said hold key to split the calling line and connect said impulsing means to the trunk circuit, a single motion impulse responsive rotary stepping switch connected in said trunk circuit having a normal position and adapted to be stepped in response to a predetermined number of impulses from said impulsing means to an operated position for selecting an idle trunk line in said group of trunk lines, means in said circuit operable in the event the selected trunk line is busy to step said switch to a position to select another trunk line in said group of trunk lines and to continue to step said switch until an idle trunk line is selected, means controlled by restoration of said hold key after selection of a trunk line to connect said calling line with the selected trunk line, and means in said trunk circuit responsive to the operation of said release key to step said switch to return to its normal position.

7. In a telephone system including, a calling line, an attendant's position, and a group of trunk lines, said attendant's position having answer release, and hold keys together with impulsing mechanism, an information trunk circuit for connecting said calling line to the attendant's position and for extending a connection of said calling line over a trunk line in said trunk line group, said trunk circuit including in combination, means controlled by the operation of said answer key to provide a conversation connection between said calling line and said position, means controlled by the operation of said hold key to split the calling line and connect said impulsing means to the trunk circuit, impulse responsive switching means connected in said trunk circuit having a normal position and movable in response to a predetermined number of impulses from said impulsing means to an operated position for selecting an idle trunk line in said group of trunk lines, means in said circuit operable in the event the selected trunk line is busy to move said switching means to a position to select another trunk line in said group of trunk lines and to continue to move said switching means until an idle trunk line is selected, and means in said circuit operable in the event that all trunk lines are busy to restore said switching means to normal and transmit a busy signal to said position, means controlled by restoration of said hold key after transmittal of said busy signal to directly connect said busy signal to said calling line.

8. In a telephone system including, a calling line, an attendant's position, and a group of trunk lines, said attendant's position having answer, release, and hold keys together with impulsing mechanism, an information trunk circuit for connecting said calling line to the attendant's position and for extending a connection of said calling line over a trunk line in said trunk line group, said trunk circuit including in combination, means controlled by the operation of said answer key to provide a conversation connection between said calling line and said position, means controlled by the operation of said hold key to split the calling line and connect said impulsing means to the trunk circuit, a single motion impulse responsive rotary stepping switch connected in said trunk circuit having a normal position and adapted to be stepped in response to a predetermined number of impulses from said impulsing means to an operated position for selecting an idle trunk line in said group of trunk lines, means in said circuit operable in the event the selected trunk line is busy to step said switch to a position to select another trunk line in said group of trunk lines and to continue to step said switch until an idle trunk line is selected, and means in said circuit operable in the event that all trunk lines are busy to step said switch to return to its normal position and transmit a busy signal to said attendant's position, means controlled by restoration of said hold key after transmittal of said busy signal to directly connect said busy signal to said calling line.

9. In a telephone system including, a calling line, an attendant's position, and at least two groups of trunk lines, said attendant's position having answer, release, and hold keys together with impulsing mechanism, an information trunk circuit for connecting said calling line to the attendant's position and for extending a connection of said calling line over a trunk line in a selected trunk line group, said trunk circuit including in combination, means controlled by the operation of said answer key to provide a conversation connection between said calling line and said position, means controlled by the operation of said hold key to split the calling line and connect said impulsing means to the trunk circuit, impulse responsive switching means connected in said trunk circuit having a normal position and movable in response to a predetermined number of impulses from said impulsing means to an operated position for selecting an idle trunk line in one of said groups of trunk lines and in response to a predetermined different number of impulses to a different operated position for selecting an idle trunk line in another of said groups of trunk lines, means in said circuit operable in the event the selected trunk line is busy to move said switching means to a position to select another trunk line in the same group of trunk lines as determined by the original number of impulses and to continue to move said switching means until an idle trunk line in the same group of trunk lines is selected, means controlled by restoration of said hold key after selection of an idle trunk line to connect said calling line with the selected trunk line, and means in said trunk circuit responsive to the operation of said release key to restore said switching means to normal position.

10. In a telephone system including, a calling line, an attendant's position, and at least two groups of trunk lines, said attendant's position having answer, release, and hold keys together with impulsing mechanism, an information trunk circuit for connecting said calling line to the attendant's position and for extending a connection of said calling line over a trunk line in a selected trunk line group, said trunk circuit including in combination, means controlled by the operation of said answer key to provide a conversation connection between said calling line and said position, means controlled by the operation of said hold key to split the calling line and connect said impulsing means to the trunk circuit, impulse responsive switching means connected in said trunk circuit having a normal position and movable in response to a predetermined number of impulses from said impulsing means to an operated position for selecting an idle trunk line in one of said groups of trunk lines and in response to a predetermined different number of impulses to a different operated position for selecting an idle trunk line in another of said groups of trunk lines, means in said circuit operable in the event the selected trunk line is busy to move said switching means to a position to select another trunk line in the same group of trunk lines as determined by the original number of impulses and to continue to move said switching means until an idle trunk line in the same group of trunk lines is selected, and means in said circuit operable in the event that all trunk lines in the same trunk group are busy to restore said switching means to normal and transmit a busy signal to said attendant's position, means controlled by restoration of said hold key after transmittal of said busy signal to directly connect said busy signal to said calling line.

11. In a telephone system including, a calling line, an attendant's position, and at least two groups of trunk lines, said attendant's position having answer, release, and hold keys together with impulsing mechanism, an information trunk circuit for connecting said calling line to the attendant's position and for extending a connection of said calling line over a trunk line in a selected trunk line group, said trunk circuit including in combination, means controlled by the operation of said answer key to provide a conversation connection between said calling line and said position, means controlled by the operation of said hold key to split the calling line and connect said impulsing means to the trunk circuit, a single motion impulse responsive rotary stepping switch connected in said trunk circuit having a normal position and adapted to be stepped in response to a predetermined number of impulses from said impulsing means to an operated position for selecting an idle trunk line in one of said groups of trunk lines and in response to a predetermined different number of impulses to a different operated position for selecting an idle trunk line in another of said groups of trunk lines, means in said circuit operable in the event the selected trunk line is busy to step said switch to a position to select another trunk line in the same group of trunk lines as determined by the original number of impulses and to continue to step said switch until an idle trunk line in the same group of trunk lines is selected, means controlled by restoration of said hold key after selection of an idle trunk line to connect said calling line with the selected trunk line, and means in said trunk circuit responsive to the operation of said release key to step said switch to return to its normal position.

12. In a telephone system including, a calling line, an attendant's position, and at least two groups of trunk lines, said attendant's position having answer, release, and hold keys together with impulsing mechanism, an information trunk circuit for connecting said calling line to the attendant's position and for extending a connection of said calling line over a trunk line in a selected trunk line group, said trunk circuit including in combination, means controlled by the operation of said answer key to provide a conversation connection between said calling line and said position, means controlled by the operation of said hold key to split the calling line and connect said impulsing means to the trunk circuit, a single motion impulse responsive rotary stepping switch connected in said trunk circuit having a normal position and adapted to be stepped in response to a predetermined number of impulses from said impulsing means to an operated position for selecting an idle trunk line in one of said groups of trunk lines and in response to a predetermined different number of impulses to a different operated position for selecting an idle trunk line in another of said groups of trunk lines, means in said circuit operable in the event the selected trunk line is busy to step said switch to a position to select another trunk line in the same group of trunk lines as determined by the original number of impulses and to continue to step said switch until an idle trunk line in the same group of trunk lines is selected, and means in said circuit operable in the event that all trunk lines are busy to step said switch to return to its normal position and transmit a busy signal to the attendant's position, means controlled by restoration of said hold key after transmittal of said busy signal to directly connect said busy signal to said calling line.

References Cited in the file of this patent

UNITED STATES PATENTS

| | | |
|---|---|---|
| 2,087,930 | Voss | July 27, 1937 |
| 2,249,475 | Kessler | July 15, 1941 |
| 2,567,190 | Deakin | Sept. 11, 1951 |